United States Patent [19]

McMaster et al.

[11] Patent Number: 4,909,824

[45] Date of Patent: Mar. 20, 1990

[54] APPARATUS FOR BENDING GLASS SHEETS

[75] Inventors: Harold A. McMaster, Woodville; Thomas E. Feehan, Toledo, both of Ohio

[73] Assignee: Glasstech, Inc., Perrysburg, Ohio

[21] Appl. No.: 367,757

[22] Filed: Jun. 19, 1989

Related U.S. Application Data

[63] Continuation-in-part of Ser. No. 249,718, Sep. 27, 1988, which is a continuation of Ser. No. 83,675, Aug. 7, 1987, Pat. No. 4,822,398.

[51] Int. Cl.$^4$ .............................................. C03B 23/03
[52] U.S. Cl. ........................................ 65/273; 65/104; 65/106; 65/291
[58] Field of Search .................. 65/104, 106, 273, 291

[56] References Cited

U.S. PATENT DOCUMENTS

| | | | |
|---|---|---|---|
| 4,111,676 | 9/1978 | Mechling et al. | 65/104 X |
| 4,376,643 | 3/1983 | Kahle | 65/273 X |
| 4,483,703 | 11/1984 | Keller | 65/106 X |
| 4,822,398 | 4/1989 | McMaster et al. | 65/104 X |

Primary Examiner—Arthur Kellogg
Attorney, Agent, or Firm—Brooks & Kushman

[57] ABSTRACT

An apparatus (10) is disclosed for bending and tempering a heated glass sheet (12) between first and second bending platens (14,32). Platens (14,32) include actuators (22,36) respectively, for deforming the platens (14,32) to form the desired bend in the glass sheet (12) therebetween the platens (14,32). A vertical guide (16) constrained at both ends (18,20) controls vertical movement of the first platen (14) and a central actuator (42) constrained at both ends (44,46) controls vertical movement of the second platen (32). The vertical guide (16) and central actuator (42) cooperably operate to control the specific geometric orientation of the bend on the glass sheet (12).

11 Claims, 4 Drawing Sheets

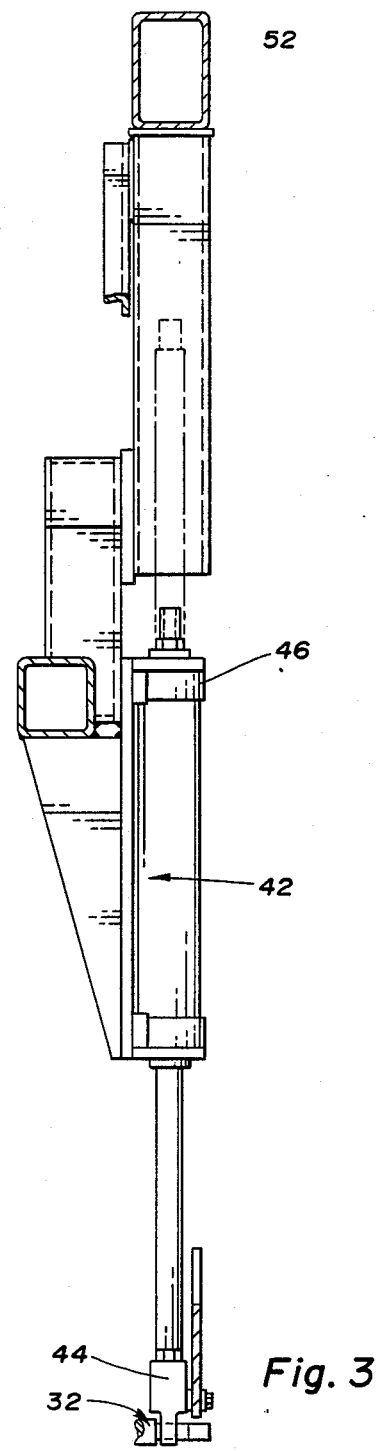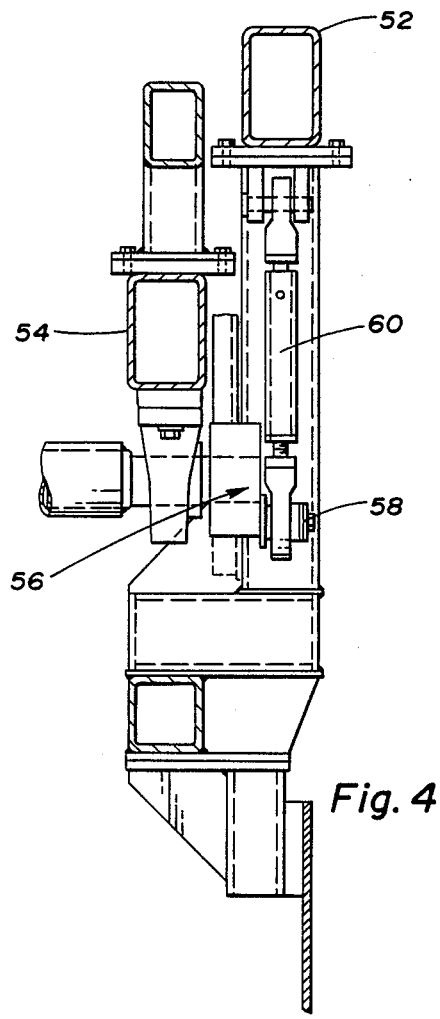

APPARATUS FOR BENDING GLASS SHEETS

CROSS-REFERENCE TO RELATED APPLICATION

This application is a continuation-in-part of application Ser. No. 249,718 filed Sept. 27, 1988, which is a continuation of application Ser. No. 083,675 filed Aug. 7, 1987, now Pat. No. 4,822,398 both of which are hereby incorporated by reference.

TECHNICAL FIELD

This invention relates to an apparatus for bending and quenching glass sheets.

BACKGROUND ART

The co-pending applications to the herein disclosed invention relate to bending and quenching heated glass sheets wherein combined bending and quenching at one station reduce roll marking and press face distortion in the bent glass sheets, blemishes associated with conventional bending and tempering apparatus. A pair of spaced opposed platens are provided for controlled bending and subsequent quenching of a heated glass sheet.

During the operation of the bending and quench station, it was discovered that even though the shape of the bend in the glass sheet was correct after the bending, there occasionally was relative horizontal movement between the upper and lower platens during the bending. It also appeared that this relative horizontal movement resulted because the actuators that provided vertical displacement of the platens which resulted in the bent shape were pivotally connected to the platens. With such pivotal connection, a properly shaped bend could be accomplished in the heated glass sheet received on the lower platen; however, the specific geometric orientation of the bend on the glass sheet could vary if the upper and lower platens moved relative to one another. Thereby a longitudinally extending bend in the glass sheet could be created that was nearer, in a transverse direction to, an outside edge of the glass sheet, the outside edge being parallel to the bend.

DISCLOSURE OF THE INVENTION

An object of the present invention is to provide an apparatus for bending and tempering glass sheets at one station wherein the specific geometric orientation of the bend on the glass sheet is controllable and repeatedly reproducible during a production operation.

In carrying out the above objects and other objects of the invention, the glass bending and tempering apparatus constructed in accordance with the invention comprises a first platen. The first platen is deformable and includes, in combination, a vertical guide constrained at both ends for guiding vertical motion and auxiliary actuators, each actuator being reversibly extendable and also being pivotal at both ends for deforming the first platen from a planar shape to a bent shape with reference to the vertical guide. The first platen includes quench openings throughout the extent thereof. The quench openings of the first platen are movable during the deformation of the platen.

A second platen, having quench openings throughout the extent thereof, opposes the first platen in a spaced relationship with a heated glass sheet therebetween the platens. The second platen follows the first platen during the bending. The auxiliary actuators of the first platen are constrainable and have the ability to move portions of the first platen a controlled distance to form the desired bent shape in the heated glass sheet. Quenching gas is supplied to the quench openings of both platens upon completion of the bending to both sides of the glass sheet to temper the bent glass sheet between the platens.

The second platen includes second platen actuators, each being reversibly extendable and also being pivotal at both ends. The second platen actuators are used to maintain the configuration of the second platen at various steps during the bending. Also included is a central actuator constrained at both ends for vertical movement.

The apparatus includes a control mechanism operable for regulating vertical displacement of the first platen about the vertical guide and the central actuator thereby providing a reference for controlled bending. The control mechanism is programmable and also controls the second actuators prior and subsequent to the bending. In a preferred embodiment of the invention, the platen actuators are defined by a cable drive actuation system. Preferably, the central and secondary actuators are defined by piston and cylinder arrangements.

A support mounts the opposed bending platens at upper and lower locations with respect to each other. The support includes upper and lower frame members that are articulated. Support actuators are operable for providing relative vertical movement between the frame members, establishing opened apart and closed together positions of the frame members. The first an second platen actuators are connected to the lower and upper frame members, respectively, whereby the frame members allow facilitated indexing of the glass sheet into and out of the apparatus in the opened apart position and provide for bending and quenching in the closed together position of the frame members, in connection with coordinated operated of the first and second platen actuators The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 3 is a sectional view taken along lines 3—3 in FIG. 2 illustrating the central actuator which is constrained for vertical movement;

FIG. 4 is a sectional view taken along lines 4—4 in FIG. 2 illustrating a support actuator for providing relative vertical movement between upper and lower frame members, establishing opened apart and closed together positions.

BEST MODE FOR CARRYING OUT THE INVENTION

Figure 1:
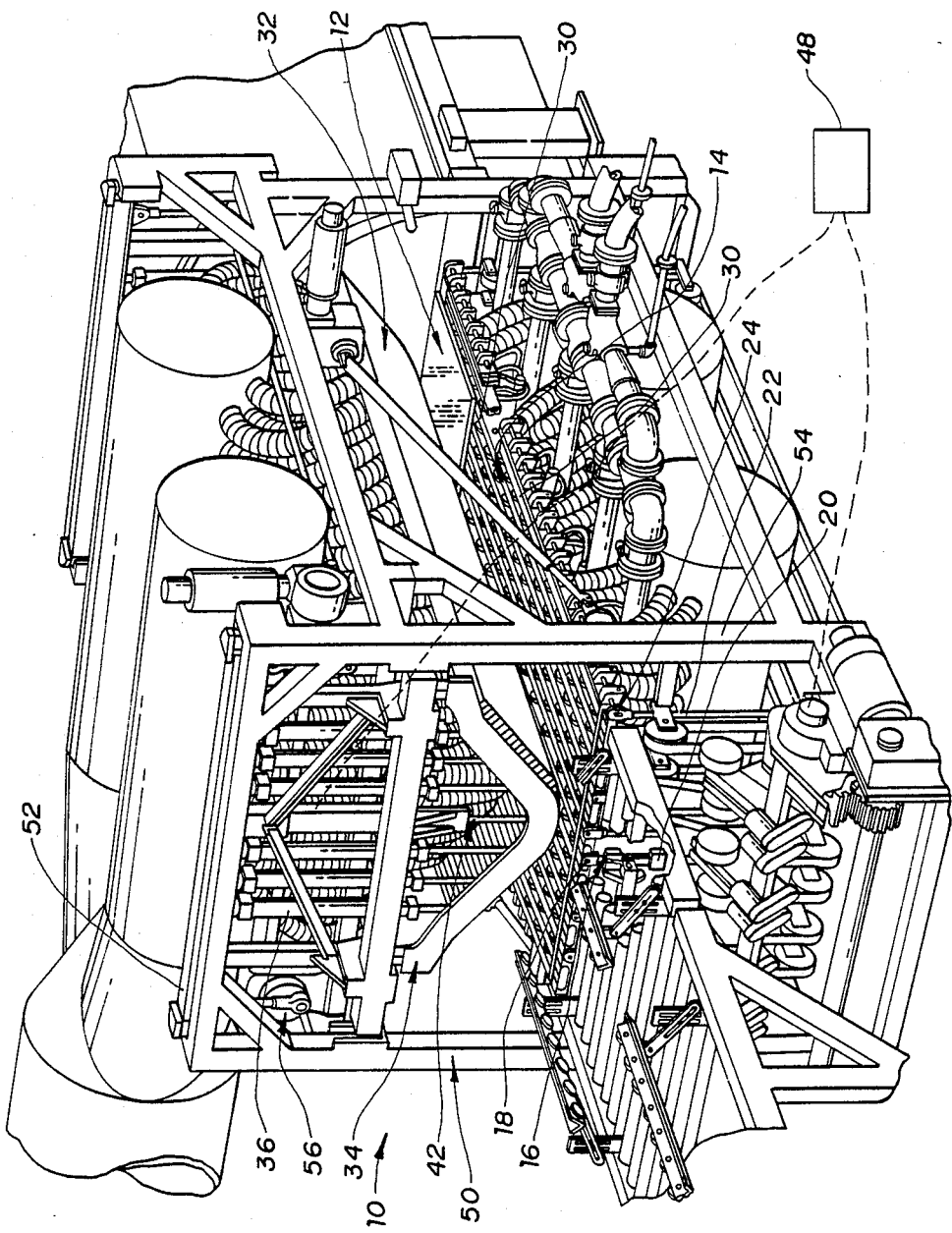
FIG. 1 is a perspective view of an apparatus for bending and tempering glass sheets constructed in accordance with the present invention and illustrating a pair of opposed bending platens including a vertical guide and central actuator for controlled bending.

Referring to FIG. 1 of the drawings, an apparatus for bending and tempering glass sheets constructed in accordance with the present invention, is generally indicated by reference numeral 10 ad used to bend and quench a heated glass sheet 12 at one station. As is hereinafter more fully described, the bending and tempering apparatus 10 provides a specific geometric orientation of a bend in the glass sheet 12. Furthermore, bending and tempering apparatus 10 is operable for repeatedly reproducing an accurate bend in glass sheets under production operation.

As shown in FIG. 1, the glass bending and tempering apparatus 10 comprises a first platen 14 for receiving the heated glass sheet 12 to be bent. The first platen 14 is deformable and includes, in combination, a vertical guide 16 constrained at both ends 18, 20 for guiding vertical motion of the first platen and first platen actuators 22, each being reversibly extendable and also being pivotal at both ends 24, 26 for deforming the first platen from a planar shape to a bent shape with reference to the vertical guide. First platen actuators 22 are shown as a plurality of cable driven mechanical actuators, although it is contemplated within the scope of the invention to utilize piston and cylinder arrangements or ball screw actuators or even a single actuator within the scope of the invention.

First platen actuators 22 are controllable to control the amount of bending or deformation of the first platen 14 across the platen 14. The first platen includes quench openings 30 throughout, as more thoroughly described in the copending applications. The quench openings 30 are movable with the platen 14 during deformation of the platen which performs the bending.

A second platen 32 also has quench openings 30 throughout the platen. The second platen 32 opposes the first platen 14 in spaced relationship with the glass sheet 12 therebetween. The first platen actuators 22 are constrainable and have the ability to move portions of first platnn 14 a controlled distance to form the desired bent shape in the glass sheet 12 between the platens 14,32 as the lower platen urges the upper platen near or against template 34, illustrated in phantom in FIG. 5.

In the preferred embodiment, the second platen 32 includes second platen actuators 36, each being reversibly extendable and also being pivotal at both ends 38,40. The second platen actuators 36 are used to maintain the configuration of the second platen at various steps during the bending. The second platen 32 also includes a central actuator 42 constrained at both ends 44, 46 for vertical movement. The second platen actuators 36 are defined by conventional piston and cylinder arrangements.

A control mechanism 48 is operable for regulating vertical displacement of the first platen 14 whereby a predetermined portion of the first platen 14 is lifted to form a desired bend in the glass sheet 12. The vertical displacement of the first platen 14 occurs with reference to the verticle guide 16 and further controlled movement of the central actuator 42, thereby providing a reference for controlled bending to control the specific geometric orientation of the bend in the glass sheet 12. Control mechanism 48 is programmable and functions to control the bending such that movement of the first platen actuators 22, second platen actuators 26 and central actuator 42 create a substantially uniform bending rate throughout the glass sheet 12.

Figure 2:
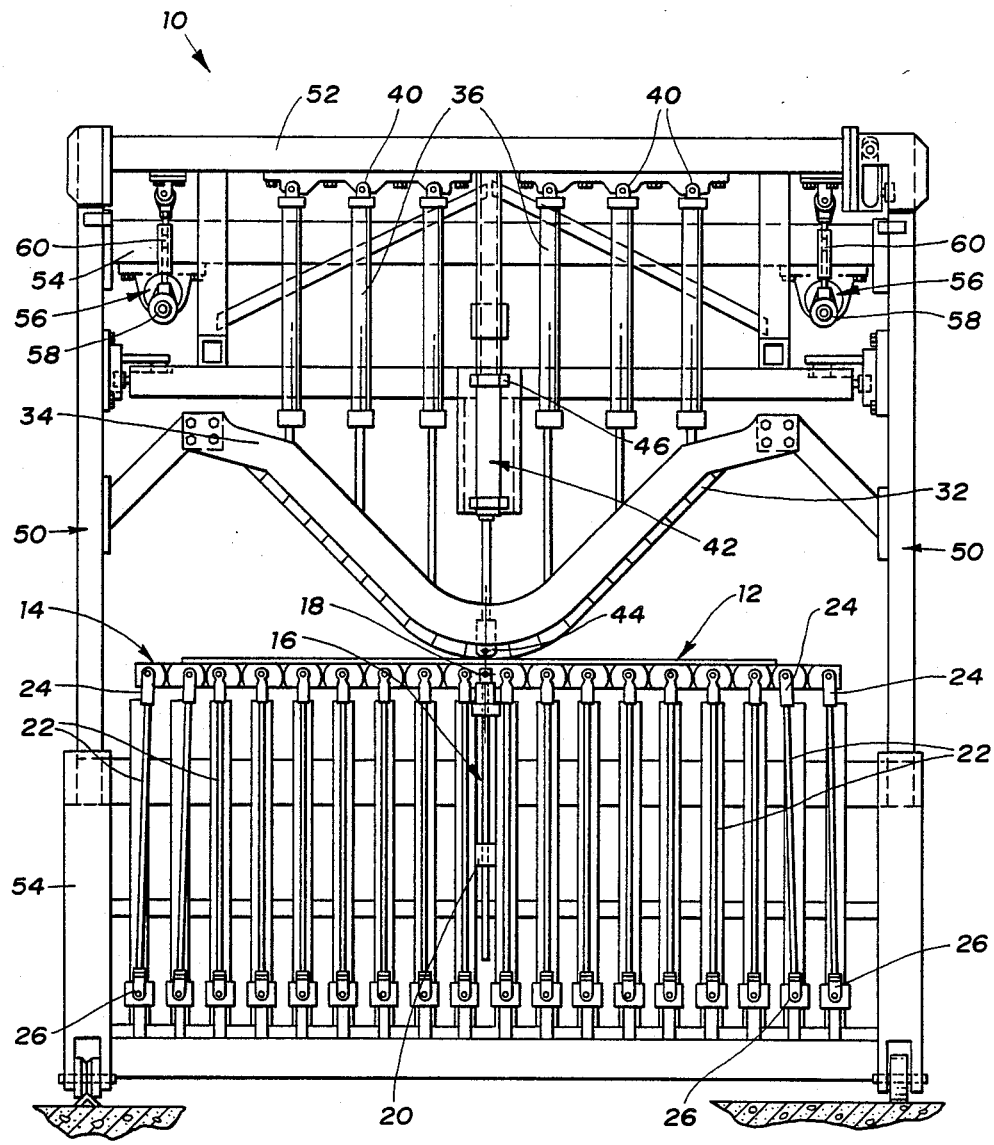
FIG. 2 is an end view of the apparatus illustrating a support including upper and lower frame members that mount the opposed bending platens, actuators that regulate movement of portions of the platens, the vertical guide and the central actuator.
Figure 5:
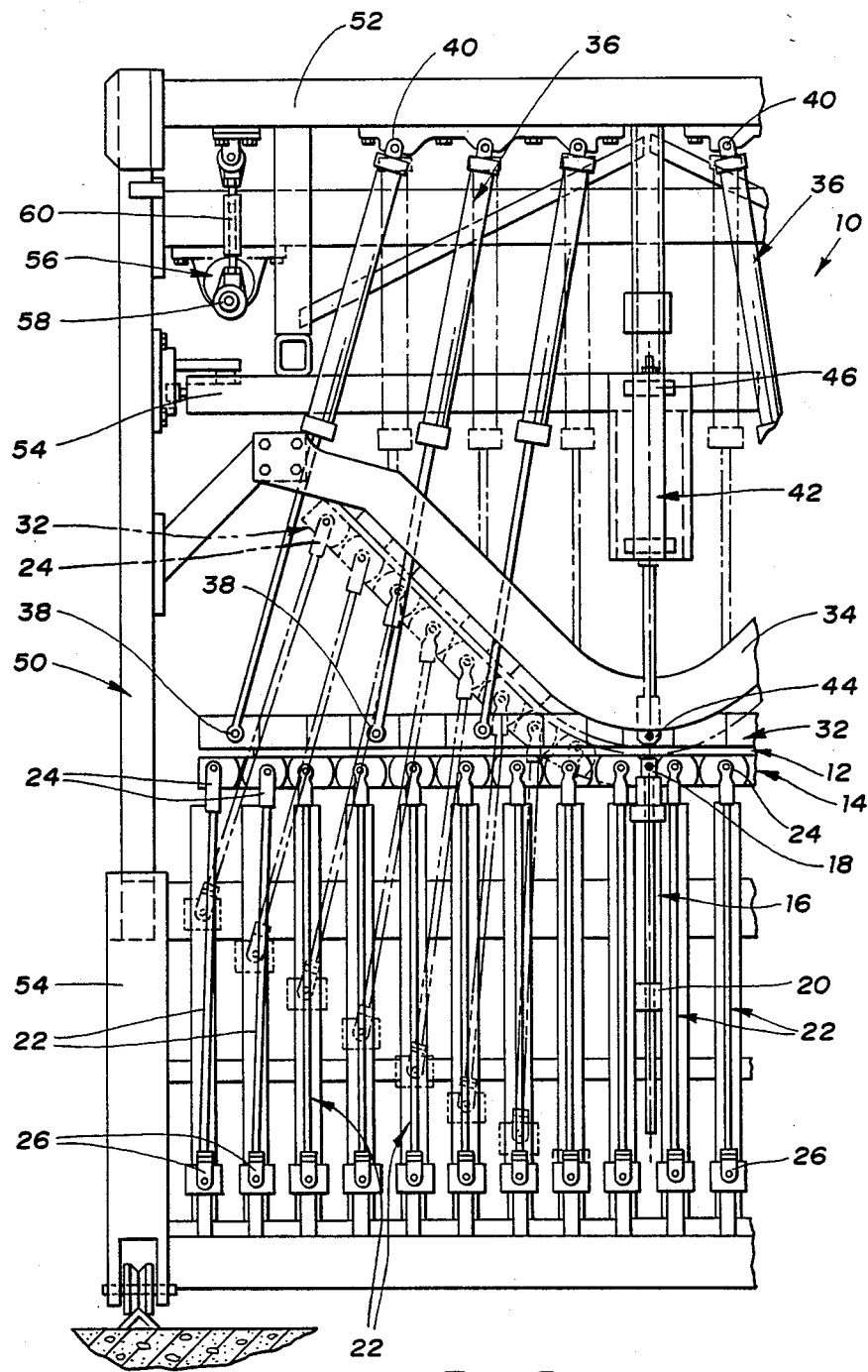
FIG. 5 is a partial end view of the apparatus illustrating the frame members in the closed together position with a glass sheet therebetween the platens and also illustrating in phantom the lower platen being deformed to bend the glass sheet near or against a bending template.

As shown in FIGS. 1, 2 and 5, a support 50 mounts the opposed bending platens 14,32 at upper and lower locations with respect to each other. The support 50 includes upper and lower frame members 52,54 that are articulated with respect to each other. A support actuator 56, shown in FIG. 4, is operable for providing relative vertical movement between frame members 52,54 establishing opened apart and closed together positions of the frame members. Support actuator 56 includes a crank 58 and connecting linkage 60 arraggement. In the preferred arrangement, four support actuators 56 are utilized.

The first platen actuators 22 are connected to the lower frame member 54 and the second platen actuators 36 and central actuator 42 are connected to the upper frame member 52. Operation of the support actuator 56 rotates crank 58 to displace linage 60 and thereby move frame members 52,54 allowing facilitated indexing of the glass sheet 12 into and out of the apparatus 10 in the opened apart position of the frame members in connection with coordinated operation of the first and second platen actuators 22,36. The glass sheet 12 is bent between the platens 14,32 in the closed together position of the frame members as the first platen actuators 22 are operated. Operation of the support actuator 56 can be controlled by control mechanism 48.

While the best mode for carrying out the invention has been described in detail, those familiar with the art to which this invention relates will recognize various alternative designs and embodiments for practicing the invention as defined by the following claims.

What is claimed is:

1. An apparatus for bending and tempering a heated glass sheet comprising: a first platen; said first platen being deformable and including in combination a vertical guide constrained at both ends for guiding vertical motion and first platen actuators each being reversibly extendable and also being pivotal at both ends for deforming said platen from a planar shape to a bent shape with reference to said vertical guide; said first platen including quench openings throughout the extent thereof; said quench openings of the first platen being movable therewith during the deformation of the platen; a second platen having quench openings throughout the extent thereof and opposing the first platen in spaced relationship with the glass sheet therebetween; said actuators being constrainable and having the ability to move portions of said first platen a controlled distance to form the desired bent shape in the glass sheet; and quenching gas being supplied to the quench openings of both platens and thereby to both sides of the glass sheet to temper the bent glass sheet between the platens.

2. Apparatus as in claim 1 wherein said second platen includes second platen actuators, each being reversibly extendable and also being pivotal at both ends to maintain the configuration of said second platen at various steps during the bending.

3. Apparatus as in claim 2 wherein said second platen includes a central actuator constrained at both ends for vertical movement.

4. Apparatus as in claim 3 wherein said actuators are defined by piston and cylinder arrangements.

5. Apparatus as in claim 4 further including a control mechanism operable for regulating vertical displacement of said first platen about said vertical guide and central actuator thereby providing a reference for controlled bending.

6. Apparatus as in claim 1 wherein said control mechanism is programmable and functions to control the bending.

7. Apparatus as i claim 6 further including a support that mouts the opposed bending platens at upper and lowerllocations with respect to each other.

8. Apparatus as in claim 7 wherein said support includes upper and lower frame members; said members being articulated; support actuators·operable for providing relative vertical movement between said frame members establishing opened apart and closed together positions of the frame members; an said first and second platen actuators being connected to said lower and upper frame members respectively; said frame members allowing facilitated indexing of the glass sheet into and out of the apparatus in the opened apart position of the frame members in connection with coordinated operation of said first and second platen actuators and also providing for bending in the closed together position of the frame members in connection with coordinated operation of said first and second platen actuators.

9. Apparatus as in claim 8 wherein said support actuators include a crank and connecting linkage arrangement.

10. An apparatus for bending and tempering a heated glass sheetccomprising: a first platen; said first platen being deformable and including in combination a vertical guide constrained at both ends for guiding vertical motion and first platen actuators each being reversibly extendable and also being pivotal at both ends for deforming said first platen from a planar shape to a bent shape with reference to said vertical guide; said first platen including quench openings throughout the extent thereof; said quench openings of the first platen being movable therewith during the deformation of the platen; a second platen; said second platen opposing said first platen in spaced relationship with the glass sheet therebetween; said second platen including in combination second platen actuators, each being reversibly extendable and also being pivotal at both ends to control the configuration of said second platen and also a central actuator constrained at both ends for vertical movement; said central actuator being cooperable with said vertical guide to provide a reference for controlled bendigg; said second platen having quench openings throughout the extent thereof; and quenching gas being supplied to the quench openings of both platens and thereby to both sides of the glass sheet to temper the bent glass sheet between the platens.

11. An apparatus for bending and tempering a heated glass sheet comprising: a support including upper and lower frame members; a support actuator operable for providing relative vertical movement between the frame members; a first platen mounted on said lower frame member; said first platen being deformable and including in combination a vertical guide constrained at both ends for guiding vertical motion and first platen actuators each being reversibly extendable and also being pivotal at both ends for deforming said platen first from a planar shape to a bent shape with reference to said vertical guide; said first platen including quench openings throughout the extent thereof; said quench openings of the first platen being movable therewith during the deformation of the platen; a second platen mounted on said upper frame member; said second platen opposing said first platen in spaced relationship with the glass sheet therebetween; said second platen including in combination second platen actuators, each being reversibly extendable and also being pivotal at both ends to control the configuration of said second platen and also a central actuator constrained at both ends for vertical movement; said central. actuator being cooperable with said vertical. guide to provide a reference for controlled bending; said second platen having quench openings throughout the extent thereof; and quenching gas being supplied to the quench openings of both platens and thereby to both sides of the glass sheet to temper the bent gaass sheet between the platens.

* * * * *

UNITED STATES PATENT AND TRADEMARK OFFICE
CERTIFICATE OF CORRECTION

PATENT NO. : 4,909,824

DATED : March 20, 1990

INVENTOR(S) : HAROLD A. McMASTER ET AL

Page 1 of 3

It is certified that error appears in the above-identified patent and that said Letters Patent is hereby corrected as shown below:

Column 3, line 10, after "10" and before "used", "ad" should be --and--;

Column 3, line 45, after "first" and before "14", "platnn" should be --platen--;

Column 3, line 64, after "the" and before "guide", "verticle" should be --vertical--;

Column 4, line 15, after "60" and before ""In", "arraggement." should be --arrangement.--;

Column 5, line 9, claim 7, after "as" and before "claim", "i" should be --in--

Column 5, line 10, claim 7, after "that" and before "the", "mouts" should be --mounts--;

UNITED STATES PATENT AND TRADEMARK OFFICE
CERTIFICATE OF CORRECTION

PATENT NO. : 4,909,824

DATED : March 20, 1990

INVENTOR(S) : HAROLD A. McMASTER ET AL

It is certified that error appears in the above-identified patent and that said Letters Patent is hereby corrected as shown below:

Column 5, line 11, claim 7, "lowerllocations" should be --lower locations--;

Column 5, line 17, claim 8, after "members" and before "said", "an" should be --and--;

Column 5, line 31, claim 10, after "glass", "sheetccomprising" should be --sheet comprising--;

Column 6, line 8, claim 10, "bendigg;" should be --bending--;

Column 6, line 36, claim 11, after "said" and before "guide", "verticaI" should be --vertical--; and

UNITED STATES PATENT AND TRADEMARK OFFICE
CERTIFICATE OF CORRECTION

PATENT NO. : 4,909,824

DATED : March 20, 1990

INVENTOR(S) : Harold A. McMaster, et al

It is certified that error appears in the above-identified patent and that said Letters Patent is hereby corrected as shown below:

Column 6, line 41, claim 11, after "bent" and before "sheet", "gaass" should be --glass--.

Signed and Sealed this

Twenty-fourth Day of September, 1991

Attest:

HARRY F. MANBECK, JR.

Attesting Officer

Commissioner of Patents and Trademarks